United States Patent [19]

Van der Hardt Aberson

[11] 4,299,586
[45] Nov. 10, 1981

[54] COMPOSITE DRIVING BELT AND TRANSVERSE ELEMENT FOR SAME

[75] Inventor: Frederik E. C. Van der Hardt Aberson, Eindhoven, Netherlands

[73] Assignee: Van Doorne's Transmissie B.V., Tilburg, Netherlands

[21] Appl. No.: 119,177

[22] Filed: Feb. 6, 1980

[30] Foreign Application Priority Data

Feb. 6, 1979 [NL] Netherlands .................. 7900923

[51] Int. Cl.³ .................. F16G 1/00; F16G 5/00
[52] U.S. Cl. .................... 474/201; 474/242
[58] Field of Search ........... 474/201, 240, 242, 244, 474/272

[56] References Cited

U.S. PATENT DOCUMENTS

| 1,898,035 | 2/1933 | Diamond | 474/242 |
| 3,720,113 | 3/1973 | Van Doorne et al. | 474/242 |
| 3,949,621 | 4/1976 | Beusink | 474/242 |
| 4,080,841 | 3/1978 | Vollers | 474/201 |

FOREIGN PATENT DOCUMENTS

| 62996 | 7/1913 | Austria | 474/242 |
| 2414989 | 10/1975 | Fed. Rep. of Germany | 474/201 |
| 1066329 | 6/1954 | France | 474/201 |
| 256918 | 9/1948 | Switzerland | 474/201 |
| 1329 | of 1907 | United Kingdom | 474/201 |

*Primary Examiner*—Lawrence J. Staab
*Attorney, Agent, or Firm*—Cushman, Darby & Cushman

[57] ABSTRACT

In a driving belt for use with V-shaped pulleys, including an endless flexible carrier and a plurality of transverse elements abutting against each other in face-to-face contact and assembled on the carrier, said transverse elements being provided with coupling means comprising at least one projection at one face and at least one substantially corresponding coupling recess at the other face, the improvement wherein the thickness of the transverse elements at the location of the coupling means is smaller than the distance between the abutting faces of successive transverse elements.

6 Claims, 7 Drawing Figures

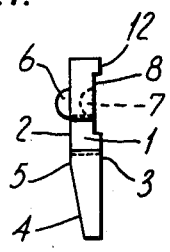
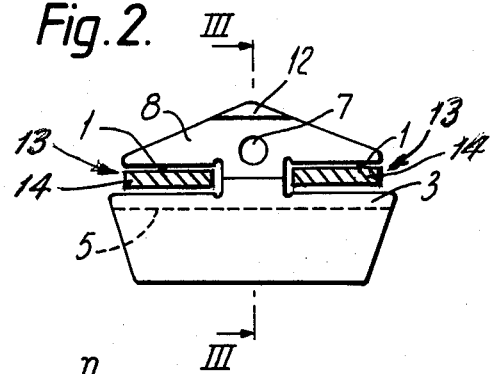
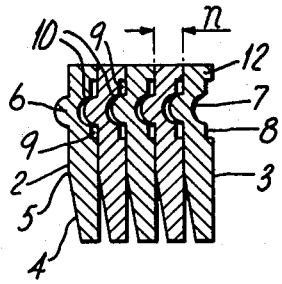
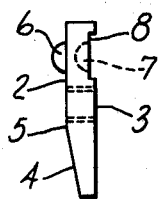
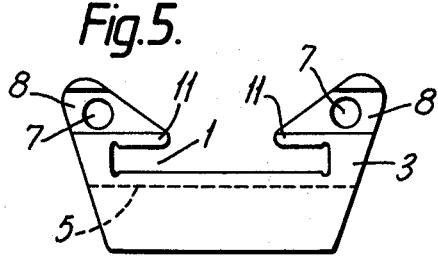
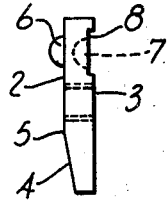
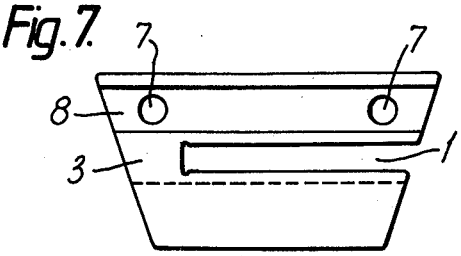

COMPOSITE DRIVING BELT AND TRANSVERSE ELEMENT FOR SAME

This invention relates to a composite endless driving belt of the kind constructed of a flexible endless carrier and a plurality of plate-like elements mounted transversely on the carrier and in face-to-face abutting relationship with each other. The invention also relates to plate-like elements for use in such belts.

BACKGROUND

A known type of driving belt for use with V-shaped pulleys comprises a flexible endless carrier, such as at least one endless metal band, and a plurality of plate-like elements assembled slidably on the carrier, the elements lying transverse to the carrier and abutting one another. Each transverse element includes coupling means in the form of at least one projection on one of its faces or head sides and and at least one recess in the opposite face or head side, the arrangement being such that each projection fits into a recess in an adjacent transverse element. In use of such a belt power is transmitted by thrust forces between the transverse elements. The projections and recesses serve to center or align the transverse elements with each other. Belts of this kind find particular utility in variable ratio transmissions of the kind having pulleys each formed of two conical discs which are axially adjustable toward and away from each other. The belts described in U.S. Pat. Nos. 3,949,621 (FIGS. 1 and 5) and 4,080,841 (FIG. 3) are examples of known belts of the kind to which the present invention relates.

For proper operation of the projections and recesses of the transverse elements, it is highly important that these accurately enmesh, so that a proper and clearance-free fixation of the transverse elements is obtained.

It is an object of the present invention to provide a driving belt and a transverse element therefor in which an optimal mutual coupling of the transverse elements can be effected.

SUMMARY OF THE INVENTION

According to the present invention, in order to improve the mutual coupling of transverse elements, the thickness of the transverse elements, i.e. the distance between the two faces of a transverse element at a location adjacent the coupling means, is smaller than the nominal thickness of the transverse elements, i.e. the distance between corresponding abutting surfaces of successive transverse elements. The result of this relationship is that there is a clearance between the transverse elements around the place of engagement of the projections in the recesses. As a result it is possible that the projection through a substantially cylindrical area, at some distance from the face whereon the projection is disposed, engages in the recess. This will be further explained on the basis of the drawing. Moreover this makes it possible to effect a highly accurate fit of the projection in the recess. Depending on the dimensions of the projection or recess, a face may as a matter of fact be ground off until the projection engages in the recess to such an extent that a very accurate fit is present.

Referring more specifically to the two thickness dimensions identified above, it is pointed out that during use of the belt each transverse element in a straight length of the belt is in contact with the two adjacent elements along two parallel planes which are defined by flat surfaces on the faces of the elements. The distance between these planes, i.e. the distance between the flat abutting surfaces of an element, is the nominal thickness of the element. According to the present invention the projection or the recess or both are located at a place of lesser thickness, i.e. for a given element the distance between the portions of the faces at the location of the projections or recesses is less than the nominal thickness of the element.

In a preferred embodiment according to the invention, one face of each transverse element may be provided with a recessed part in situ of or surrounding the projection or the recess, which recessed part extends in a path, in an axial direction relative to the driving belt, along the entire head side. Such a recessed part may be formed simply by means of a grinding operation, and, if desired, both faces can be easily finish-ground.

Preferably according to the invention, the coupling recesses may be positioned in the recessed part of the face of the transverse element. By grinding said face and accurate fit may be obtained. The projection, which is present at the opposite face, does not interfere with the grinding operation.

The invention futhermore relates to a transverse element suitable for use in the described driving belt. Such a transverse element, in assembled condition, rests with its faces against the faces of abutting transverse elements and is provided with coupling means comprising at least one projection at one face and substantially corresponding recess(es) at the other face. According to the invention the thickness of the transverse element, i.e. the distance between both faces at locations adjacent the coupling means, is smaller than the nominal thickness of the transverse element, i.e. the distance between corresponding abutting surfaces of successive transverse elements in assembled condition. According to a further feature of the invention, a face may be provided with a recessed part near the projection or the recess or both which recessed part extends laterally from edge to edge of the element.

Preferably according to the invention, the coupling recess or recesses are disposed in the recessed part of the face.

BRIEF DESCRIPTION OF THE DRAWINGS

FIG. 1 is a side view of a transverse belt element embodying the principles of the present invention;

FIG. 2 is a front view of the element of FIG. 1;

FIG. 3 is a sectional view taken on the line III—III of FIG. 2;

FIGS. 4 and 5 are side and front views, respectively, of a second embodiment of transverse element; and FIGS. 6 and 7 are side and front views, respectively, of a third embodiment of transverse element.

In the various embodiments, corresponding parts are indicated by identical reference numerals.

DETAILED DESCRIPTION

FIGS. 1 and 2 show an embodiment of a transverse element of the type as described in U.S. Pat. Nos. 3,949,621 (FIG. 1) and 4,080,841 (FIG. 3), modified according to the present invention. A composite driving belt is formed by a plurality of these elements and a carrier 13 (shown in FIG. 2 only), the carrier 13 comprising two endless bands 14 or band packages which on either side of the elements are pushed into laterally facing slots 1 in the elements. During the use of the driving belt, the bands 14 or band packages are prevented from laterally sliding out of the transverse elements by the walls of the V-shaped grooves in the pulleys.

The transverse element is provided with two head sides or faces 2, 3 which come into contact with the faces of successive transverse elements when assembly on the carrier 10 has taken place. The face 2 is bevelled or tapered at 4. The transition of the flat part of the face 2 parallel to the flat face 3 and the bevel 4 is formed by a roll-off zone or tilting line 5. During the bending of the driving belt, the transverse elements remain in mutual contact through said tilting line 5.

The transverse element is provided with coupling means in the form of a coupling projection 6 on the face 2 and a coupling recess 7 in the face 3. The transverse element is furthermore fitted with a recessed part 8 in the face 3, which recessed part 8 extends laterally along the entire face 3, viz. in horizontal direction of the Figure.

FIG. 3 shows a plurality of transverse elements in cross-section on the line III—III of FIG. 2. The transverse elements are abutting each other as is the case in a straight part of a driving belt. The nominal thickness of a transverse element is shown by the letter n, this being the distance between the flat surfaces which abut flat surfaces on the two adjacent elements.

FIG. 3 shows that the projection 6 of each transverse element engages in a coupling recess 7 in an adjacent element. Since the coupling recess 7 is situated in a recessed part 8, the thickness of the transverse element at a location around the projection 6 and the coupling recess 7 is smaller than the nominal thickness. As a result a space 9 is present between each two transverse elements, around the coupling means. It will be clear that the best counteract against mutual displacement of the transverse elements will be achieved by a cylindrical contact area perpendicular in respect of the faces 2 and 3. Such area is substantially present on the surface of the projection 6 at some distance from the face 2. As a result of space 9 the inner surface of the coupling recess 7 contacts the surface of the projection 6 through said substantially cylindrical contact area 10 spaced from the face 2 of the transverse element. In practice such contact area 10 appears to satisfy better than for instance a projection that entirely or with a substantial part of its surface butts in the recess.

FIGS. 4 and 5 show an embodiment of a transverse element of the type described in U.S. Pat. No. 3,720,113, modified according to the present invention. The carrier (not shown) in the form of a single endless band or band package is pushed from above into the recess 1 of the transverse element, after which the lips 11 are bent in the position shown. The coupling means comprise two projections 6 and two coupling recesses 7. The recesses 7 are disposed in recessed parts 8 of the face 3.

The transverse element according to FIGS. 6 and 7 is of the type as described, e.g. in Swiss Pat. 256,918 (FIGS. 6 and 7) and German Offenlegungsschrift 2,414,989, modified according to the present invention. The transverse element is provided with a recess 1, wherein the carrier (not shown) is inserted laterally. Here too, two projections 6 and two coupling recesses 7 are present, which latter are situated in a recessed part 8.

It will be clear in particular from FIG. 3 that an exact fit of a projection 6 in a coupling recess 7 may be obtained by grinding off the face 3 to a sufficient degree. In the illustrated embodiments the recessed part 8 is situated in the face 3 where the coupling recess 7 is present. It is also possible to provide the recessed portion 8 in face 2 or in both faces 2 and 3.

It is likewise possible to design the part 12 of the face 3 shown in FIGS. 1, 2 and 3 as a recessed part, so that the transverse elements do not touch each other above the coupling means (see FIG. 3). If desired, the transverse elements may thereby not only be centered mutually by the coupling means, but likewise mutually transmit a pressure force via the coupling means.

The manufacture of the transverse elements may be effected by a blanking operation from sheet or strip material, whereby likewise the projection 6 and coupling recess 7 and, if desired, also the bevel 4 and the recessed part 8 may be blanked. The pertinent techniques are known per se.

What is claimed is:

1. In a driving belt for use with V-shaped pulleys, including an endless flexible carrier and a plurality of transverse elements abutting against each other in face-to-face contact and assembled on the carrier, said transverse elements being provided with coupling means comprising at least one projection at one face and at least one substantially corresponding coupling recess at the other face, the improvement wherein the thickness of the transverse elements at the location of the coupling means is smaller than the distance between the abutting faces of successive transverse elements.

2. A driving belt as in claim 1 wherein a face of each transverse element is provided with a recessed part around the projection or the coupling recess thereby providing said smaller thickness, said recessed part extending in a path, in the axial direction relative to the driving belt, along the entire face.

3. A driving belt as in claim 1 or 2 wherein the coupling recess of each element is disposed in said recessed part.

4. A transverse element for a composite driving belt, said transverse element having opposed flat faces which, in an assembled belt, abut the flat faces of two adjacent elements, said transverse element being provided with coupling means comprising at least one projection on one of said faces and at least one substantially corresponding recess at the other face, the thickness of the transverse element at the location of the coupling means being smaller than the distance between said flat faces.

5. A transverse element as in claim 4 wherein said smaller distance is provided by a recessed part around the projection or the recess, said recessed part extending in a lateral path along the respective face from edge to edge.

6. A transverse element as in claim 4 or 5 wherein the coupling recess is disposed in the recessed part of said face.

* * * * *